G. G. BARRY.
DEMOUNTABLE RIM.
APPLICATION FILED DEC. 20, 1918.
1,358,923.
Patented Nov. 16, 1920.
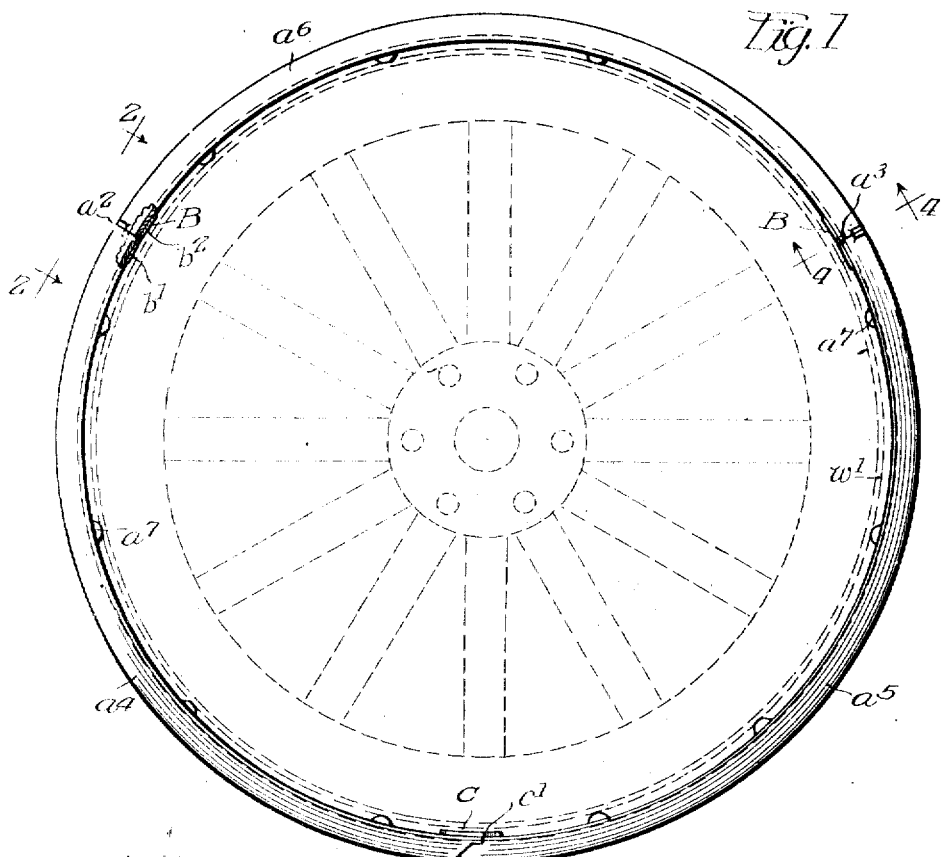
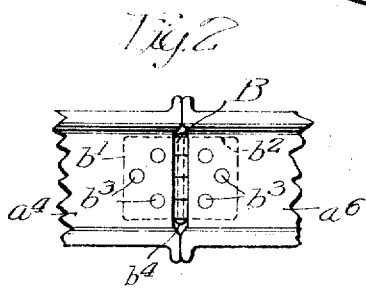
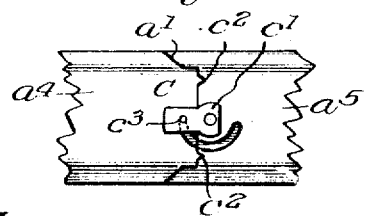
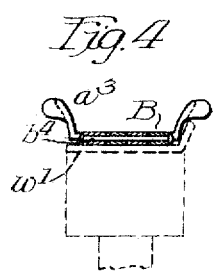
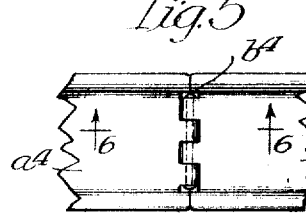
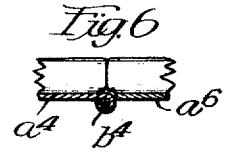
Inventor
Gerald G. Barry

UNITED STATES PATENT OFFICE.

GERALD G. BARRY, OF CHICAGO, ILLINOIS.

DEMOUNTABLE RIM.

1,358,923.　　　　Specification of Letters Patent.　　Patented Nov. 16, 1920.

Application filed December 20, 1918. Serial No. 267,627.

*To all whom it may concern:*

Be it known that I, GERALD G. BARRY, a citizen of the United States, and a resident of Chicago, in the county of Cook and State of Illinois, have invented certain new and useful Improvements in Demountable Rims for Vehicle-Tires, of which invention the following is a specification.

Demountable rims are now being quite generally employed with automobile wheels, enabling the removal from the wheel of both the tire and the rim carrying the same when repairs are needed and the replacement thereof by a fully inflated and mounted extra tire which is carried. Although this permits the further task of removing the tire from the rim and again replacing same to be put off, nevertheless that generally arduous and exasperating task remains to be performed, and is responsible for the expenditure of a great deal of time and energy in using ordinary rims; and this notwithstanding some improvements have been made, named rather unwarrantably, however, "quick-detachable."

The present invention has for its object the making of this task of positioning or removing the tire an easy one, and the invention consists in the provision of a structure which is cheap and simple to manufacture, requires no change in the established tire and wheel sizes, and is adapted to be very readily positioned or withdrawn from operative mounted relation with the tire. The manufacturers and users of rims will readily appreciate the advantages of the improvements provided by the present invention from a consideration of the description of same in this specification thereof, together with the accompanying drawings forming a part of the specification.

Referring to the accompanying drawings,—Figure 1 is a side elevation, showing the new collapsible rim, some parts broken away to expose details, with the outline of a wheel body on which the rim may be demountably secured dotted in, the rubber tire carried by the rim in the complete wheel structure, however, not being shown.

Fig. 2 is a face view of a part, taken on the line 2—2 of Fig. 1, showing adjoining sections of the rim base band at one of the transverse partings united by a hinge, the opposite arms of the hinge being secured to the adjoining ends of the sections of the rim band by rivets or otherwise; this view also showing the abutting ends of the side flanges, which project outwardly from the base band and embrace the tire seats, to be flared near the top in order to provide increased abutment surface.

Fig. 3 is a view looking down upon the simple locking device preferably employed for detachably securing the adjoining ends of the rim sections at one of the transverse partings.

Fig. 4 is a section on the line 4—4 of Fig. 1, taken at the center of one of the hinged partings, showing the way the limited space is utilized, also showing the flare which may be given to the abutting flange ends.

Fig. 5 is a view showing a modified form of hinge means of swinging the sections inwardly, and Fig. 6 is a sectional elevation therethrough, as indicated at 6—6 of Fig. 5. In this modified form the hinges, instead of being separately attached devices, are made as an integral part of the section ends, the respective intermeshing fingers encircling the pintle being formed on the same blank, and when positioned the pintle is then inserted in place. These views also show the abutting flanges to be without any additional flare at the extreme outer portion, as illustrated in other views.

Various forms of demountable rims are now on the market, including some having one transverse split provided with a locking device of some sort, adapted when demounted to permit the adjoining ends of the one-split ring to be sprung apart or drawn apart by special tools. But with most rims now on the market it is still necessary to perform some more or less difficult work of prying and hammering, with possible injury to the casing and inner tube, before the tire can be positioned on or removed from the rim. The present invention provides a rim which is subdivided into a plurality of sections, and adapted to be easily collapsed and quite readily positioned or removed, without the aid of any special tools or requiring prying and hammering and injury to the tire.

Referring to the drawings now more in detail, Fig. 1 illustrates the rim structure to be sectionized into three substantially equal portions of its circumference, and instead of there being only one transverse parting slit, such as marked here at $a^1$, provided with a detachable locking means, there are two additional transverse slits parting the rim, as indicated at $a^2$ and $a^3$, the sections of the rim being here marked $a^4$, $a^5$ and $a^6$. At the two additional partings $a^2$ and $a^3$, a suitable hinge means, element B, is provided, uniting adjoining ends of sections of the rim, the ends at the remaining parting $a^1$ being detachably secured by a locking device, element C.

It will be observed that the hinges are connected to or form an integral part of the base band portion of the rim, and that the usual side flanges, which project outwardly from the base band and embrace the sides of the tire seats, are simply cut through but normally tightly abut each other. It will be apparent that when the section ends at the parting $a^1$ have been unlocked, that instead of being barely capable of being sprung apart from the normal abutment, the ends may be swung very free and clear, the section $a^4$ swinging inwardly on the hinge at $a^2$, and the section $a^5$ swinging in on the hinge at the parting $a^3$; and that these two sections having been folded up and cleared, the distance across from $a^2$ to $a^3$, embraced by the remaining section $a^6$, being less than the diameter of the tire, section $a^6$ may be freely placed or withdrawn. In first positioning the rim within the tire, the rim structure is collapsed, the section $a^6$ placed to embrace its circumferential portion of the tire seats, then the sections $a^5$ and next $a^4$ are swung outwardly into embracing engagement with their respective portions of the tire and secured by the locking element B. In removing the rim structure from the tire, the order is reversed, of course. Obviously, the rim and tire are demounted from the wheel when such collapsing and positioning operations are performed.

It will be observed that the parting through the flanges, with the hinges uniting the base band sections, leaves the sections free to swing inwardly in collapsing, but that when swung back into the normal annular form the abutting surfaces of the adjacent flange ends acts as a rigid stop and prevents the sections from being swung out beyond the ring form, even when there is no tire in place on the rim.

While I have shown the rim sectionized into three substantially equal length portions of the circumference, it will be obvious that additional partings may be provided, although this is unnecessary. More than two partings should be used, however, in order that the segments of the circle embraced by each section will not equal the diameter of the tire. Three, as shown, or more, allows the collapsed structure to be quite freely positioned or removed as required, while if any section embraced half or more of the tire's circumference there would be difficulty in getting that section in or out of place.

The two hinges employed, element B, may each comprise a simple form of flat hinge, the opposite flat arm plates $b^1$ and $b^2$, extending across practically the full width of the base band, being respectively secured at the ends of the adjoining base band sections by rivets or otherwise, as indicated at $b^3$ in Fig. 2, and the usual projecting staggered and intermeshing fingers from the respective arm plates bent to encircle a pintle $b^4$. The pintle when inserted may have its ends swaged to prevent same coming out of place. A more simple method of forming the hinge means upon which to swing the sections is shown in Fig. 5 and Fig. 6. Here the pintle encircling fingers are formed integrally on the ends of the respective sections of the rim band, and no separately attached pair of arm plates is required, but simply the positioning of the projecting fingers in the proper intermeshing relation and then inserting the pintle.

The spaced difference between the inside diameter of the tire seats and the outside diameter of the usual metal band $w^1$ found on the wheel felly, is very limited, frequently not much more than one-quarter of an inch, this being taken up by the thickness of the base band of the rim and the bosses, such as indicated at $a^7$, or similar supports, intended to permit the rim to be placed or freed more easily than if the wheel felly band $w^1$ and the demountable rim base band were in entire surface contact. Where a separately attached hinge arm plate is employed, as shown in Figs. 1 and 2, the plates $b^1$ and $b^2$ being secured inside the base band, the said bands are cut out beyond the line of the parting through the outer flanges, and the pintle encircling fingers extend into this space, so as to get the benefit of the rim band thickness for such housing space. Fig. 1 and Fig. 6 make this a little clearer. Fig. 6 also shows more clearly that the abutting contact of adjoining sections of the flange portions permits the said sections to be swung inwardly on their hinge but not outwardly.

Element C represents my preferred form of locking means for detachably securing the section ends at the one parting $a^1$, in order that the sections $a^4$ and $a^5$, may be disengaged and folded back. Other forms of locking means for securing the adjoining ends of the rim here may be used; for example, another hinge member but having a removable pintle. My preference, however, is for the simple locking means here shown. This consists in varying the transverse parting slit from one on a true radius line of the rim, as at $a^2$ and $a^3$, to a more irregular one, as shown at the parting $a^1$ in Fig. 1 and Fig. 3. The junction line through the side flanges here is on a more oblique angle, which may recede at the base band, so that the adjacent ends of the base band and flanges have abutting engagement with section $a^4$ resting on and supported by $a^5$, and thus, with the abutting contact of the flanges at the partings $a^2$ and $a^3$, there can be no outward yielding without forcibly springing the circle, which is furthermore practically impossible when the tire is on the rim. To the section $a^5$ is also pivoted a swinging arm or flat lock piece $c^1$; see Fig. 3. When this is swung around on the pivot and rests wholly on the section $a^5$, the parting slit between the base bands is uncovered and the two adjoining rim sections may be freed from abutting engagement and swung inwardly, or the reverse. It will be noticed that the more oblique angle of the slit through the side flanges here makes this operation much easier than if the parting was on a straight line the same as at $a^2$ and $a^3$, while at the same time the other purpose of the close abutment of the flanges is served. The ends at the slit across the base band at this detachable parting may also have projecting points on one section end and receiving recesses therefor on the other end, as indicated at $c^2$, to prevent any lateral displacement; although when the tire is in place on the rim there is not much chance of this. When the section ends are brought into abutting relation and the pivoted arm $c^1$ is swung around over the end of the section $a^4$, it will be noticed that the two sections are secured against disengagement. The arm $c^1$ may also be provided with a downwardly projecting pivot head $c^3$ on the underside thereof, and the bands $a^4$ and $a^5$ with a curved groove in which such projection $c^3$ may travel when the arm $c^1$ is being swung around from open to locked position, and when the arm is swung on to the end of the section $a^4$, across the parting slit, this projection on the arm, extending down in such groove on the section, would prevent any possible springing of the rim circle. However this is hardly necessary when the tire is in place on the rim. Such whole assembly, however, makes a secure locking arrangement.

In the foregoing I have described the invention in its preferred embodiment, but it will be obvious that various changes may be made in the construction without departing from the spirit and scope of the invention. For example, various forms of locking devices may be employed in place of the more simple one I have here shown; also "clencher" type flanges may be used instead of the type for "straight side" tires I have here shown. I no not, therefore, wish any undue limitation to result from the detailed description herein given, but desire the claims appended hereto to be construed as broadly as possible in view of the prior art relating to rims.

Having described my invention, what I claim as new and desire to secure by Letters Patent is the following:

1. A demountable rim for vehicle tires comprising an annular band provided with a flange on each side thereof for embracing the tire beads, the said base band and side flanges being split transversely at three substantially equidistant points of the circumference, at one of said parting splits suitable locking means for there detachably securing the adjoining sections of the rim, at the two remaining partings suitable hinges connecting adjoining sections of the rim and adapted to permit inward movement thereof, and the flanges at said partings arranged to have abutting surfaces flared and enlarged to prevent the sections swinging outward beyond the normal circle, substantially as set forth.

2. A demountable rim for vehicle tires, said rim comprising an annular base band provided with a circumferential outwardly extended integral flange on each side thereof, said rim base band and the side flanges being split transversely into more than two sections, none of which sections shall equal as much as one-half of the rim's circumference, means uniting the base band sections but adapted to permit the sections to be swung inwardly, and the ends of the flanges enlarged, flared and arranged to normally closely abut and restrict undue outward swinging movement of the sections.

3. A demountable rim for vehicle tires, said rim comprising an annular base band provided with a circumferential outwardly extended integral flange on each side thereof, said rim band and the side flanges thereof being split transversely into a plurality of sections, means uniting the base band sections but adapted to permit the sections to be swung inwardly, and the ends of the flanges enlarged, flared and arranged to closely abut and restrict undue outward swinging movement of the sections beyond the normal annular form of the rim.

4. A demountable rim for vehicle tires, said rim comprising an annular base band provided with a circumferential flange on each side thereof, the said annular band and the side flanges being divided transversely at three points in the circumference, at two of said dividing points suitable hinges uniting the adjoining base bands of the rim sections, arranging the adjoining ends of the side flanges to have abutting contact, and at the remaining parting slit or division of the rim annulus a locking means for there detachably securing the adjoining sections, said locking means consisting in so forming the rim ends at that parting that the slit through the flanges is on an angle more oblique than a radius line of the rim, the ends of the flanges on one of the sections being outside of and supporting the adjoining flange ends, the portion of the parting slit through the base band adapted to permit the adjoining base band ends to abut directly, a projecting part on the end of one band and on the opposite section end a recess to receive the same, the intermeshing thereof adapted to prevent lateral displacement of the respective sections, an arm on the inside of the base band and pivoted to and near the end of the before mentioned section whose flange ends lie outside and act as a support against outward displacement, said pivoted arm being adapted to be swung around and across the transverse parting slit and over a portion of the adjoining section, thus preventing inward disengagement of the sections, and said pivoted arm also provided with a projection on the underside thereof and the base band sections with a suitable groove in which the said projection may move when the arm is being swung around, all substantially as and for the purposes set forth.

5. In a demountable rim for vehicle tires, said rim comprising an annular base band provided with a circumferential flange on each side thereof, and said rim provided with a transverse parting slit through the base band and side flanges, means at said parting for detachably securing the adjoining ends of the rim, said means consisting in so forming the rim ends at the parting that the portion of the slit through the flanges is on an angle more oblique than a radius line of the rim, the ends of the flanges on one side of the parting being outside of and supporting the adjoining flange ends, the portion of the cross slit through the base band adapted to permit the adjoining base band ends to abut directly, a projecting part on one base band end and on the adjacent end a recess to receive the said projecting part and the intermeshing of the two adapted to prevent lateral displacement, an arm on the inside of the base band pivoted to and near the end of the before mentioned portion whose flange ends lie outside and act as a support against outward displacement, said pivoted arm being adapted to be swung around across the transverse parting slit and over a portion of the opposite rim band end to prevent inward disengagement, and said pivoted arm also provided with a projection on the underside thereof and the adjoining ends of the base band with a suitable groove in which the said projection may move when the arm is being swung around from open to closed position or the reverse, said projection coöperating with its groove adapted to prevent the springing of the rim, substantially as set forth.

6. In a demountable rim for vehicle tires, said rim including an annular band provided with a circumferential flange on each side thereof, and said rim provided with a transverse parting slit through the band and side flanges, means at said parting for detachably securing the adjoining ends of the rim, said means consisting in so forming the rim ends at the parting that the portion of the slit through the side flanges is on an angle more oblique than a radius line of the rim, the ends of the flanges on one side of the parting being outside of and supporting the adjoining flange ends, the portion across the base band having a projecting part at one end and on the adjacent end a recess to receive the said projecting part, the intermeshing of the two adapted to prevent lateral displacement, and an arm on the inside of the base band pivoted to and near the end of the before mentioned portion whose flange ends lie outside and act as a support against outward displacement, said pivoted arm being adapted to be swung around across the transverse parting and over a portion of the opposite rim band end to prevent inward disengagement, substantially as set forth.

7. In a demountable rim for vehicle tires, said rim including an annular band, provided with a circumferential flange on each side thereof, and said rim having a transverse parting slit through the band and side flanges, means at said parting for detachably securing the adjoining ends of the rim, said means consisting in so forming the rim ends at said parting that there is provided on one end a projecting part and on the adjacent end a recess to receive said projecting part, the intermeshing of the two adapted to prevent improper lateral displacement, and an arm pivoted to and near one end of the rim and adapted to be swung across the transverse parting and upon a portion of the adjoining rim band, to prevent inward disengagement, substantially as set forth.

In testimony whereof, I have hereunto signed my name to this specification.

GERALD G. BARRY.